United States Patent [19]

Freeman

[11] Patent Number: 4,488,244
[45] Date of Patent: Dec. 11, 1984

[54] COMPUTER GRAPHIC SYSTEM WITH FOREGROUND/BACKGROUND DISCRIMINATION

[75] Inventor: William T. Freeman, Cambridge, Mass.

[73] Assignee: Polaroid Corporation, Cambridge, Mass.

[21] Appl. No.: 385,695

[22] Filed: Jun. 7, 1982

[51] Int. Cl.³ .............................................. H04N 1/46
[52] U.S. Cl. .................................... 364/525; 364/521; 358/244
[58] Field of Search ....................... 364/525, 521, 522; 358/6, 332, 333; 178/15

[56] References Cited

U.S. PATENT DOCUMENTS

| | | | |
|---|---|---|---|
| 2,531,031 | 11/1950 | de France et al. | 178/5.2 |
| 2,995,619 | 8/1961 | Freeman | 178/5.2 |
| 3,006,260 | 10/1961 | Smith et al. | 95/12 |
| 3,621,214 | 11/1971 | Romney et al. | 364/522 |
| 3,644,664 | 2/1972 | Huboi et al. | 178/5.2 A |
| 3,772,465 | 11/1973 | Vlahos et al. | 178/5.2 D |
| 3,938,164 | 2/1976 | Ohnishi et al. | 346/110 R |
| 4,009,489 | 2/1977 | Seer, Jr. | 358/80 |
| 4,112,459 | 9/1978 | Gautier et al. | 358/6 |
| 4,156,237 | 5/1979 | Okada et al. | 364/522 X |
| 4,231,061 | 10/1980 | Freeman | 358/244 X |
| 4,240,729 | 12/1980 | Barney | 354/76 |
| 4,263,001 | 4/1981 | Deutsch | 355/45 |
| 4,278,347 | 7/1981 | Okamoto et al. | 355/68 |
| 4,285,580 | 8/1981 | Murr | 351/35 |
| 4,373,156 | 2/1983 | Pfannkuch et al. | 358/332 X |

OTHER PUBLICATIONS

Microprocessor-Controlled System Prints Color TV Pictures, L. Levinson et al., Electronics, vol. 54, No. 19, Sep. 22, 1981, pp. 121-125.

Primary Examiner—Edward J. Wise
Attorney, Agent, or Firm—Edward S. Roman

[57] ABSTRACT

Apparatus and method for making and photographing computer graphic colored images by defining each computer graphic colored image as a plurality of constant color pixel groups, assigning one of a preselected number of colors to each constant color pixel group, assigning one of a preselected number of foreground-/background numbers to each constant color pixel group so as to designate its location with respect to the other constant color pixel groups, and exposing a photosensitive material to each constant color pixel group displayed in a predetermined ordered sequence and color so as to maintain the predetermined ordered foreground to background relationship between the constant color pixel groups in the exposure of the photosensitive material to the overlapping areas between the constant color pixel groups.

12 Claims, 34 Drawing Figures

BASIC VARIABLE MEMORY

STEP 1

| CCPG | POSITION | COLOR | FOREGROUND/BACKGROUND NO. |
|---|---|---|---|
| RECTANGLE NO. 1 | 17,1 = X POSITION OF 1ST END POINT OF DIAGONAL<br>9,1 = Y POSITION OF 1ST END POINT OF DIAGONAL<br>30,1 = X POSITION OF 2ND END POINT OF DIAGONAL<br>25,1 = Y POSITION OF 2ND END POINT OF DIAGONAL<br>0,1 = θ | DARK RED | 1 |
| RECTANGLE NO. 2 | 5,2 = X POSITION OF 1ST END POINT OF DIAGONAL<br>10,2 = Y POSITION OF 1ST END POINT OF DIAGONAL<br>20,2 = X POSITION OF 2ND END POINT OF DIAGONAL<br>25,2 = Y POSITION OF 2ND END POINT OF DIAGONAL<br>43°,2 = θ | DARK RED | 2 |
| RECTANGLE NO. 3 | 7,3 = X POSITION OF 1ST END POINT OF DIAGONAL<br>5,3 = Y POSITION OF 1ST END POINT OF DIAGONAL<br>22,3 = X POSITION OF 2ND END POINT OF DIAGONAL<br>14,3 = Y POSITION OF 2ND END POINT OF DIAGONAL<br>0,3 = θ | DARK RED | 3 |

FIG. 4A

BASIC VARIABLE MEMORY                STEP III

| CCPG NO. | FILTER NO. | FILTER COLOR | EXPOSURE TIME (SEC.) |
|---|---|---|---|
| 1 | 1 | RED | 30 |
| 1 | 2 | GRN | 0 |
| 1 | 3 | BLUE | 0 |
| 2 | 1 | RED | 30 |
| 2 | 2 | GRN | 0 |
| 2 | 3 | BLUE | 0 |
| 3 | 1 | RED | 30 |
| 3 | 2 | GRN | 0 |
| 3 | 3 | BLUE | 0 |

FIG. 4B

BASIC VARIABLE MEMORY                STEP V

| ITEM NO. | EXPOSURE TIME (SEC.) | FILTER COLOR |
|---|---|---|
| 1,2,3 | 30 | RED |

FIG. 4C

STEP VIII, FIRST ITERATION

STEP X, FIRST ITERATION

STEP IX, SECOND ITERATION

STEP X, SECOND ITERATION

BASIC VARIABLE MEMORY                STEP I

| CCPG NO. | POSITION | COLOR | FOREGROUND/ BACKGROUND NO. |
|---|---|---|---|
| RECT. NO.1 | SAME AS FIG. 4A | LIGHT RED | 1 |
| RECT. NO.2 | SAME AS FIG. 4A | MEDIUM RED | 2 |
| RECT. NO.3 | SAME AS FIG. 4A | DARK RED | 3 |

FIG. 6A

BASIC VARIABLE MEMORY                         STEP III

| CCPG. NO. | FILTER NO. | FILTER COLOR | EXPOSURE TIME (SEC.) |
|---|---|---|---|
| 1 | 1 | RED | 10 |
| 1 | 2 | GRN | 0 |
| 1 | 3 | BLUE | 0 |
| 2 | 1 | RED | 20 |
| 2 | 2 | GRN | 0 |
| 2 | 3 | BLUE | 0 |
| 3 | 1 | RED | 30 |
| 3 | 2 | GRN | 0 |
| 3 | 3 | BLUE | 0 |

FIG. 6B

BASIC VARIABLE MEMORY                         STEP Ⅴ

| ITEM NO. | EXPOSURE TIME (SEC.) | FILTER COLOR |
|---|---|---|
| 3 | 30 | RED |
| 2 | 20 | RED |
| 1 | 10 | RED |

FIG. 6C

STEP VIII, FIRST ITERATION

STEP IX, FIRST ITERATION

STEP X, FIRST ITERATION

STEP IX, SECOND ITERATION

EXPOSE 10 SEC.

STEP X, SECOND ITERATION

STEP VIII, SECOND ITERATION

STEP IX, THIRD ITERATION

EXPOSE 10 SEC.

STEP X, THIRD ITERATION

EXPOSE 10 SEC.

STEP VIII, FOURTH ITERATION

BASIC VARIABLE MEMORY STEP I

| CCPG NO. | POSITION | COLOR | FOREGROUND/ BACKGROUND NO. |
|---|---|---|---|
| RECT. NO.1 | SAME AS FIG. 4A | DARK RED | 1 |
| RECT. NO.2 | SAME AS FIG. 4A | LIGHT RED | 2 |
| RECT. NO.3 | SAME AS FIG. 4A | MEDIUM RED | 3 |

FIG. 8A

BASIC VARIABLE MEMORY　　　　　　　　　　　　STEP III

| CCPG. NO. | FILTER NO. | FILTER COLOR | EXPOSURE TIME (SEC.) |
|---|---|---|---|
| 1 | 1 | RED | 30 |
| 1 | 2 | GRN | 0 |
| 1 | 3 | BLUE | 0 |
| 2 | 1 | RED | 10 |
| 2 | 2 | GRN | 0 |
| 2 | 3 | BLUE | 0 |
| 3 | 1 | RED | 20 |
| 3 | 2 | GRN | 0 |
| 3 | 3 | BLUE | 0 |

FIG. 8B

BASIC VARIABLE MEMORY　　　　　　　　　　　　STEP V

| ITEM NO. | EXPOSURE TIME (SEC.) | FILTER COLOR |
|---|---|---|
| 1 | 30 | RED |
| 3 | 20 | RED |
| 2 | 10 | RED |

FIG. 8C

STEP VIII, FIRST ITERATION

STEP X, FIRST ITERATION

STEP VIII, SECOND ITERATION

STEP IX, SECOND ITERATION

STEP X, SECOND ITERATION

STEP IX, THIRD ITERATION

STEP X, THIRD ITERATION

STEP VIII, THIRD ITERATION
STEP IX, X, FOURTH ITERATION

| NO | COLOR | RED FILTER EXP TIME | GRN FILTER EXP TIME | BLUE FILTER EXP TIME |
|---|---|---|---|---|
| 1 | RED | 30 | 0 | 0 |
| 2 | GRN | 0 | 30 | 0 |
| 3 | BLUE | 0 | 0 | 30 |
| 4 | YELLOW | 30 | 30 | 0 |
| 5 | CYAN | 0 | 30 | 30 |
| 6 | MAGENTA | 30 | 0 | 30 |
| 7 | YELLOW | 30 | 30 | 0 |
| 60 | PINK | 30 | 10 | 10 |

LOOK UP TABLE

COMPUTER GRAPHIC SYSTEM WITH FOREGROUND/BACKGROUND DISCRIMINATION

BACKGROUND OF THE INVENTION

1. Field of the Invention

This invention relates generally to apparatus and method for making and photographing computer graphic images and, more particularly, to an apparatus and method for making photographic computer graphic colored images in a manner maintaining a designated order of location from foreground to backround for each of the items in the graphic image to be photographed.

2. Description of the Prior Art

The memory requirement for computer graphic color images is generally determined by the spatial and color intensity resolution of the images. Thus, large computers with large memory capacities are ordinarily required for computer graphic colored images in order to store the many bits of information required to designate the brightness and color of each pixel of the image. Computer graphic images may be suitably displayed on any conventional viewing screen such as a cathode ray tube (CRT), and a photograph of the displayed image may be made in a manner as is well known in the art. Small computers generally do not have the memory base or the processing power to deal with images satisfactorily in this way and, therefore, are generally unsatisfactory for providing computer graphic colored images for photographic reproduction. One such method and apparatus as disclosed in U.S. patent application Ser. No. 368,711, by Alice M. d'Entremont et al., filed Apr. 15, 1982, discloses a method and apparatus utilizing a small computer and a limited computer memory for developing computer graphic color images on a photosensitive material. This system, however, does not provide a capability for maintaining a designated order of location from foreground to background in case any items in the graphic image overlap.

Therefore, it is a primary object of this invention to provide a method and apparatus utilizing a small computer and a limited computer memory for developing computer graphic images on a photosensitive material wherein the items which make up the graphic image may overlap with respect to each other in a designated order of location from foreground to background.

Other objects of the invention will be, in part, obvious and will, in part, appear hereinafter. The invention accordingly comprises a mechanism and system possessing the construction, combination of elements and arrangement of parts which are exemplified in the following detailed disclosure.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection wth the accompanying drawings wherein:

FIGS. 4A-4C show charts tabulating data which defines one example of a graphic image to be photographed in the manner of this invention;

FIGS. 6A-6C show charts tabulating data which defines another example of a graphic image to be photographed in the manner of this invention;

FIGS. 8A-8C show charts tabulating the data which defines still another example of a graphic image to be photographed in the manner of this invention;

FIG. 10 is a chart tabulating the contents of the look-up table of FIG. 1.

SUMMARY OF THE INVENTION

A system for defining and displaying an image for photographic reproduction comprises video display means for visually displaying the image to be photographed. Computer means responsive to user control input signals and a preselected program operate to define and store within a computer variable memory the items of the image to be photographed as a plurality of constant color pixel groups. There is also assigned a foreground/background number to each constant color pixel group designating the order in which the constant color pixel group should appear from foreground to background in the image. The video image signal thereafter provided to the video display means operates to display each of the constant color pixel groups at a selected light color intensity to expose a selected photosensitive material while maintaining the selected ordered foreground to background relationship in the exposure of the photosensitive material to the overlapping areas between the constant color pixel groups.

The computer determines the time during which the selected photosensitive material should be exposed at the selected light color intensity for each of the constant color pixel groups. The determined exposure times are thereafter ordered into a progressively decreasing sequence so that the constant color pixel groups can be displayed to expose the photosensitive material in the ordered sequence starting with the first of the constant color pixel groups in the ordered sequence having the longest exposure times and thereafter adding succeeding constant color pixel groups in the ordered sequence so as to finally display all of the constant color pixel groups. The computer means operates to erase those portions of each constant color pixel group which are overlapped by another constant color pixel group yet to be displayed because of its succeeding position in the ordered sequence.

DESCRIPTION OF THE PREFERRED EMBODIMENTS

Figure 1:
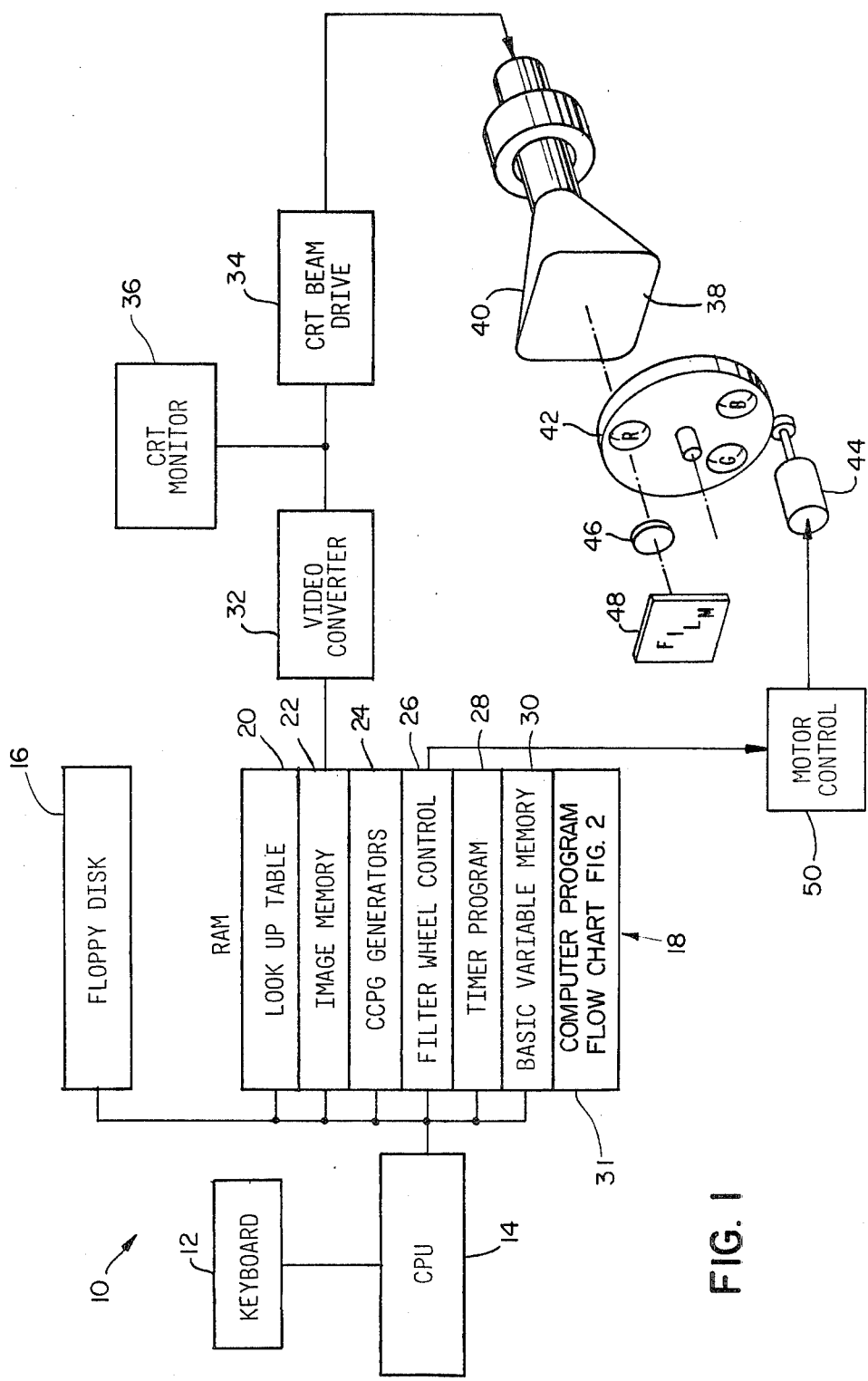
FIG. 1 is a block diagram of a system for defining and photographing a graphic image in the manner of this invention.

Referring now to FIG. 1, there is shown a system for defining and displaying an image to be photographed in the manner of this invention wherein a designated order of location from foreground to background can be maintained. A computer system as shown generally at 10 comprises an input terminal such as a keyboard 12, a central processing unit 14, and a computer memory which may comprise an external storage medium such as a floppy disk 16 and an internal random access memory (RAM) 18. The RAM 18, in turn, comprises a lookup table 20, an image memory 22, CCPG generators 24, a filter wheel control 26, a timer program 28, a variable memory 30 and a computer progam 31. The output signal from the image memory 22 is directed to a video converter 32 which, in turn, provides an output signal to a CRT monitor 36 and a cathode ray tube beam drive 34.

The output from the cathode ray tube beam drive 34, in turn, is directed to a black-and-white cathode ray tube 40 having a display screen 38 overlapped by a rotatably mounted filter wheel 42. The filter wheel 42, in turn, comprises the three primary red, green, and blue color filters, each of which may be selectively moved into overlying relationship with respect to the display screen 38 by a motor drive 44. The light from the display screen 38 is transmitted through a selected one of the red, green, and blue filters of the filter wheel 42 to a lens 46 from which it is imaged on the surface of a photosensitive material as shown at 48. As will be readily understood, the cathode ray tube 40, the filter wheel 42, the lens 46, and the photosensitive material 48 are all housed in a suitable lighttight chamber (not shown in the drawing). Motor 44, in turn, is controlled by a motor control 50 which receives an output control signal from the filter wheel control 26.

The CRT monitor 36 comprises a black-and-white cathode ray tube for use by the system user in order to enable him to define the computer graphic image to be photographed. Thus, the system user by use of the keyboard 12 and the black-and-white monitor 36 can define what the image to be photographed is to be. The system user can define the image to be photographed by making choices from lists of options presented to him by way of program menus and questions. The program menus and questions lead the user through a series of steps which enable him to define the image in a manner as is fully described in U.S. patent application Ser. No. 368,711, by Alice M. d'Entremont et al., filed Apr. 15, 1982.

Figure 2:
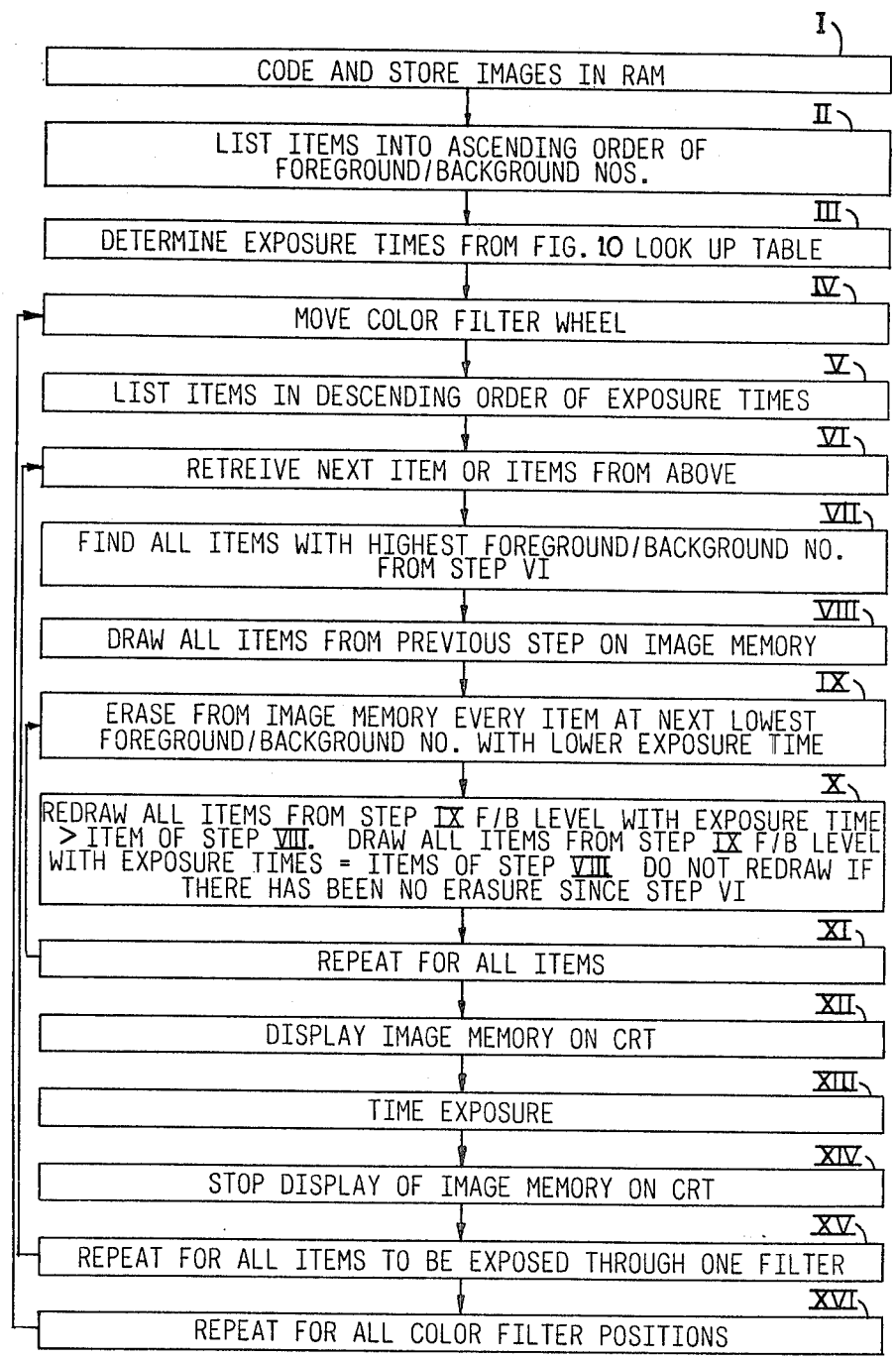
FIG. 2 is a block diagram of a flowchart for the steps to be implemented in practicing this invention.
Figure 3:
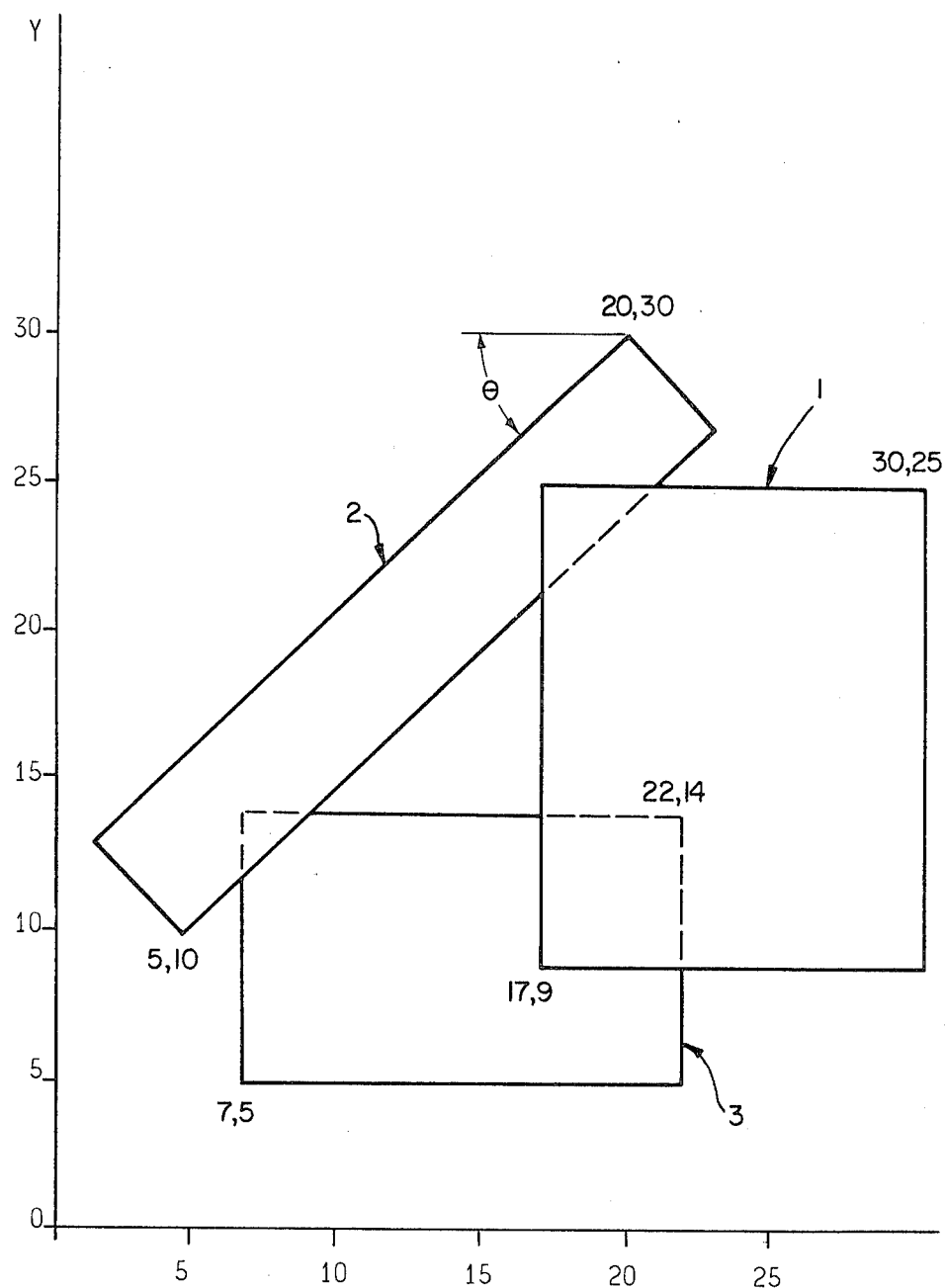
FIG. 3 shows one example of a graphic image to be photographed in the manner of this invention.

The first step that the user takes in generating an image to be photographed is to code and store the image to be photographed in the RAM 18 as shown by step I in the flowchart of FIG. 2 which details the computer program 31 of FIG. 1. Toward this end, the user is presented with program menus and questions by the CPU 14 under the direction of the computer program 31 which allow him to proceed in the following manner. The user may first be requested to define the text of the image to be photographed in response to which he may enter by way of the keyboard 12 those words which he would wish to appear as text in the image. He may also be asked to select a particular font for the text which he has previously entered into the variable memory 30 along with a particular color. For purposes of our example, it will be assumed that no text will be included in the image and that the image will comprise only three rectangles 1, 2, and 3 as shown in FIG. 3. Thus, after the computer program has asked the user to designate the particular text to be shown in the image and in response to which the user designates no text, he might next be asked to designate any rectangles to be shown in the image to which he can respond to the keyboard 12 by entering a first set of numbers defining the x position of the first end point of the diagonal of the rectangle 1, a second set of numbers designating the y position of the first end point of the diagonal of the rectangle 1, a third set of numbers designating the x position of the second end point of the diagonal of the rectangle 1, and a fourth set of numbers designating the y position of the second end point of the diagonal of the rectangle 1, as shown tabulated in FIG. 4A. An angle $\theta$ is also tabulated to designate the orientation of the rectangles with respect to the x and y axis. For rectangle 1, $\theta = 0$. Information so tabulated in this manner would be stored in the variable memory 30. The other rectangles 2 and 3 may next be defined in this manner with the end points of the rectangle being tabulated as shown in FIG. 4A. As is readily apparent from FIG. 3, the angle $\theta$ for rectangle 2 is equal to 43° and for rectangle 3, $\theta$ is equal to 0. Thus, each rectangle 1, 2, and 3 is designated by four sets of numbers in order to save computer memory capacity since it is not necessary to define each pixel in the rectangle by a tabulated data point.

The user might next be asked to select one color from as many as 60 different colors for each of the rectangles 1, 2, and 3 to which he would again respond by way of the keyboard 12 to provide the color tabulation as shown in FIG. 4A, which again would be stored by the variable memory 30. For purposes of our first example, the user has chosen the same color for each of the rectangles 1, 2, and 3 which as shown in FIG. 4A is dark red. The user might lastly be asked to select a particular foreground/background number for each of the rectangles 1, 2, and 3 to designate the position of each rectangle relative to the other two rectangles. For purposes of this example, items with lower foreground/background numbers will appear to be in front of items with higher foreground/background numbers. Thus, rectangle number 1 may have a foreground/background number of 1, rectangle number 2 may have a foreground/background number of 2, and rectangle number 3 may have a foreground/background number of 3, as also shown in the tabulated data of FIG. 4A.

It should be readily understood that the aforementioned program for a user's questions wherein the user designates only text and rectangles is presented by way of example only and in actuality the user would be requested to make choices from substantially longer lists of options which may further include lines, circles, parallelograms, preselected drawings, or any other designated images stored as digital information. Thus, the user may additionally make graphs or charts, and any one of these items can be any color which he chooses from a preselected number of colors made available by the computer program.

Since the user designates a particular color for each item tabulated in FIG. 4A, each item having a color so designated can also be referred to as a constant color pixel group (CCPG). Thus, each of the rectangles 1, 2, and 3 constitutes an individual constant color pixel group (CCPG), and whereas if there had been any text designated for the image, such text would also have constituted a separate constant color pixel group (CCPG) in the manner as is more fully described in U.S. patent application Ser. No. 368,711, supra.

Referring now to FIG. 10, there is shown the look-up table 20 wherein each of the 60 different colors from which the user may choose to designate each constant color pixel group (CCPG) is tabulated as a function of its exposure time in the three primary red, green, and blue colors for a given exposure light intensity and film speed sensitivity. Once the user has defined the image to be photographed and the CPU 14 under the direction of the computer program 31 listed the items in ascending order of foreground/background numbers (step II) in the aforementioned manner, the computer program 31 next implements step III as shown in the flowchart of FIG. 2 to determine the exposure times for each item or constant color pixel group (CCPG). The tabulated exposure times of FIG. 10 are utilized to provide a tabulation of exposure times for each item (CCPG), as shown in FIG. 4B, which is subsequently stored in the variable memory 30. Thus, the exposure times for each constant color pixel group (CCPG) through each of the primary red, green, and blue color filters is determined from the look-up table 20 by the central processing unit 14 and thereafter stored in the variable memory 30 in the form as shown in FIG. 4B.

The central processing unit 14 which is controlled by the computer program 31 thereafter provides a command by the way of the filter wheel control 26 to the motor control 50 to, in turn, actuate the motor 44 and drive the filter wheel 42 to its starting position which as shown may be with the red filter aligned between the display screen 38 and the lens 46 as illustrated by step IV in the flowchart of FIG. 2. The central processing unit 14 thereafter operates in accordance with step V of the flowchart of FIG. 2 to sort the constant color pixel groupings (CCPG's) into a descending order of exposure times for the red filter position as shown tabulated in FIG. 4C which tabulation is also stored in the variable memory 30. As is readily apparent, for our first example all the constant color pixel groups (CCPG's), rectangles 1, 2, and 3 require the same 30 second exposure time through the red color filter.

Figure 5A:
FIGS. 5A-5D show the graphic images drawn to computer image memory at various steps in the flowchart of FIG. 2 for the example of FIGS. 4A-4C.

The central processing unit 14 implements the next step VI in the flowchart of FIG. 2 by retrieving the next items to be exposed from the ordered tabulation of items in FIG. 4C, which in our example are rectangles 1, 2, and 3. The next step VII implemented by the central processing unit 14 operates to find all items with the highest foreground/background number from the previous step VI. Step VIII thereafter operates to draw all items found from the previous step VII on image memory 22. Thus, as is readily apparent since rectangle 3 is furthest in the background, it has the highest foreground/background number 3 and thus becomes the only item drawn on image memory 22 in step VIII as shown in FIG. 5A. Rectangle 3 is drawn on image memory 22 by setting all the bits to binary logic 1's in image memory 22 corresponding to rectangle 3 using selected algorithms stored in the CCPG generators 24 along with any other necessary inputs to these algorithms stored in the variable memory 30.

Figure 5B:
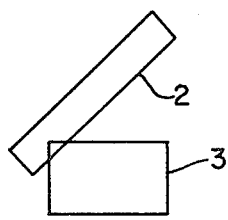

The central processing unit 14 thereafter implements the next step IX to erase from image memory 22 every item at the next lowest foreground/background number which has a lower determined exposure time. However, since all the rectangles 1, 2, and 3 have exactly the same exposure time, that being 30 seconds through the red color filter, no rectangle is erased from image memory and the image memory 22 is not changed from that shown in FIG. 5A. The central processing unit 14 next implements step X of the flowchart of FIG. 2 to redraw all items having the same foreground/background numbers as those items in the previous step IX with exposure times greater than those items of step VIII. Again, since all the rectangles 1, 2, and 3 have identical exposure times through the red color filter, none of the rectangles are redrawn; however, step X of the flowchart of FIG. 2 also operates to draw all items having the same foreground/background number as the items to be erased in the previous step IX with exposure times equal to the items of step VIII. Thus, rectangle 2 is drawn on image memory 30 as shown in FIG. 5B during step X since it has the next lowest foreground/background number with respect to rectangle 3 and has an equal exposure time with respect to rectangle 3.

Figure 5C:
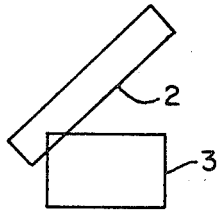

The central processing unit 14 thereafter implements step XI in the flowchart of FIG. 2 to repeat steps IX and X for a second iteration. Thus, the second iteration of step IX provides no erasure from the items drawn on image memory 22 as shown in FIG. 5C since none of the rectangles have a lower exposure time with respect to each other. The next succeeding step X of the second iteration operates to draw rectangle 1 on image memory 30 since it has the next succeeding lowest foreground/background number 1 and an exposure time equal to that of the rectangle 3 which was first drawn on image memory 22 in the previous step VIII. Thus, all the rectangles 1, 2, and 3 are drawn on image memory 22 in the second iteration of step X of the flowchart of FIG. 2 and the next succeeding step XI ends any subsequent iterations since there are no more items with lower foreground/background numbers.

Figure 5D:
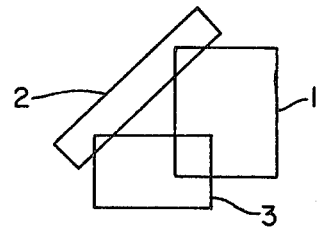

The next step implemented by the central processing unit 14 as shown in step XII of the flowchart of FIG. 2 operates to display the items drawn on image memory 22 as shown in FIG. 5D to the film 48. Thus, the central processing unit 14 provides a signal by way of the video converter 32 and CRT beam drive to activate the CRT 40 turning on the CRT beam to display the rectangles 1, 2, and 3 (CCPG's) previously drawn to the image memory 22 in the aforementioned manner.

For the example herein illustrated by the tabulations in FIGS. 4A through 4C, rectangles 1, 2, and 3 are displayed on the screen 38 at a constant electron beam intensity for exposure through the red filter to the film 48 for a period of 30 seconds. The central processing unit 14 times the exposure by way of the timer program 28 to wait for the difference between the exposure time of this group of items (CCPG's) and the exposure time for the next succeeding group of items (CCPG's). However, since in our current example, there are no succeeding groups of items (CCPG's) having shorter exposure times, the exposure is timed for the full 30 seconds and thereafter ended by a stop command from the central processing unit 14 to the CRT 40 by way of the video converter 32 and CRT beam drive 34 as shown in step XIV of the flowchart of FIG. 2.

The central processing unit 14 will thereafter implement by way of step XV a repeat of the aforementioned steps for all items (CCPG's) to be exposed for lesser times through the red filter. However, since, as previously discussed, there are no further items (CCPG's) to be exposed for lesser times through the red filter, then there is no repeat of these functions; and, the central processing unit thereafter advances to step XVI to repeat the aforementioned steps for all the individual color filter positions. Again, since there are no items (CCPG's) to be exposed through other color filter positions, the program is terminated.

In the event that the items (CCPG's) were required to be exposed through other color filters, then the aforementioned steps would be repeated for all the color filter positions by step XVI and the filter would be moved to the next filter position, which in our example is the green filter position; and, all the items (CCPG's) to which the film is to be exposed through the green filter would be exposed in the preceding manner. The central processing unit 14 would then repeat step XVI to move the filter wheel 42 to the blue filter position where again the process would be repeated for all the items (CCPG's) to which the film 48 is to be exposed by way of the blue filter. However, for our simplified example as shown tabulated in FIGS. 4A through 4C and illustrated in FIGS. 5A through 5D, we have only to expose through the red filter for a 30-second interval for all the rectangles 1, 2, and 3.

As is now readily apparent since all the rectangles 1, 2, and 3 are the same color, the foreground/background distinguishment is simplified in that the overlapped areas of the rectangles 1, 2, and 3 are identical in color to all the non-overlapped portions. However, the difficulties in maintaining the appropriate order in foreground/background relationship become significantly more complex when the colors of the rectangles 1, 2, and 3 are different shades of red as shown in our second example by the tabulated data in FIG. 6A where rectangle number 3 is dark red, rectangle number 2 is medium red, and rectangle number 1 is light red. Thus, rectangle number 3 must be exposed to the film 48 for 30 seconds through the red color filter while rectangle number 2 must be exposed to the film 48 for 20 seconds through the red color filter, and rectangle number 1 must be exposed to the film 48 for only 10 seconds through the red color filter as shown in the tabulation of FIG. 6B. Thus, the overlapped areas between the rectangles must be appropriately exposed to correspond with the overlapping rectangle which color is now different from that of the underlying rectangle.

As previously discussed, the central processing unit 14 in step III determines the exposure times for the tabulated items (CCPG's) of FIG. 6A from the look-up table 20 in FIG. 10 to provide the tabulated data as shown in FIG. 6B. The central processing unit 14 thereafter provides a command by way of the filter wheel control 26 to the motor control 50 to, in turn, actuate the motor 44 and drive the filter wheel 42 to its starting position which as shown is with the red filter aligned between the display screen 38 and the lens 46 as illustrated by step IV of the flowchart of FIG. 2. The central processing unit 14 thereafter operates in accordance with step V of the flowchart of FIG. 2 to sort the items (CCPG's) into a descending order of exposure times for the red filter position as shown tabulated in FIG. 6C which tabulation is also stored in the variable memory 30. Thus, for the example as shown in FIG. 6C, rectangle 3 requires the longest time of exposure (30 seconds) through the red color filter, rectangle 2 requires the second longest time of exposure (20 seconds) through the red color filter, and rectangle 1 requires the least time of exposure (10 seconds) through the red color filter.

Figure 7A:
FIGS. 7A-7I show the graphic images drawn to computer image memory at various steps in the flowchart of FIG. 2 for the example of FIGS. 6A-6C.
Figure 7B:
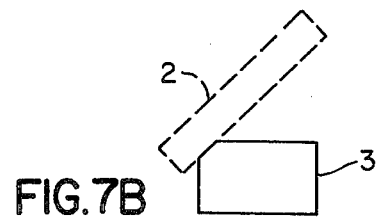
Figure 7C:
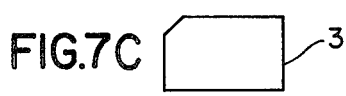
Figure 7D:
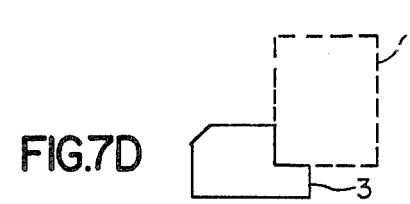

The central processing unit 14 thereafter retrieves in step VI the next item having the highest exposure time, which in our second example is rectangle 3. The next succeeding step VII thereafter finds all items with the highest foreground/background number from the previous step VI, which in our second example is rectangle 3, since it is the only rectangle (CCPG) retrieved in step VI. Next, in step VIII of the flowchart of FIG. 2, all items are drawn on image memory 22 from the previous step VII which results in the rectangle 3 being drawn on image memory as illustrated in FIG. 7A. The next step IX operates to erase from the image memory 22 every item at the next lowest foreground/background number with a lower exposure time, which in the second example is rectangle 2 having both the next lowest foreground/background number together with a lower exposure time of 20 seconds. Thus, the image drawn on image memory 22 at step IX of the flowchart of FIG. 2 is shown at FIG. 7B where the rectangle 2 is erased from image memory leaving only the rectangle 3 with the corner overlapped by the rectangle 2 erased therefrom. The next step X operates to redraw all items having the same foreground/background level as the items from the previous step IX with greater exposure times than the items of step VIII. Since neither the rectangle 1 nor 2 have exposure times greater than or equal to that of the rectangle 3 which was drawn on image memory 22 in step VIII, then neither of the rectangles 1, 2 are redrawn or drawn on image memory 22 during step X; and, the image drawn on image memory 22 at step X remains the rectangle 3 as shown in FIG. 7C.

Figure 7E:
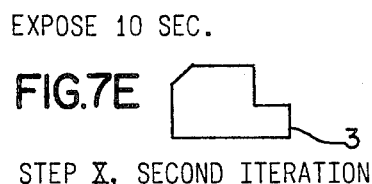

The central processing unit 14 by way of step XI thereafter implements a repeat of the aforementioned steps IX and X in FIG. 2. In step IX of the second iteration, the rectangle 1 is erased from the image memory 22 since its foreground/background number 1 is the next lowest foreground/background number from the rectangle 2 which was erased in the previous step IX of the first iteration and since it also has a lower exposure time than the rectangle 3 drawn on image memory 22 in step VIII. In the following step X, no rectangles are drawn or redrawn since neither rectangle 1 nor 2 has an exposure time equal to or greater than the exposure time of rectangle 3. Thus, only one item is drawn on image memory 22 in the second iteration of step X as shown in FIG. 7E and comprises rectangle 3 from which the portions overlapped by rectangles 1 and 2 are erased. The next step XI does not operate to repeat any further iterations since rectangle 1 has the lowest foreground/background number.

The next step implemented by the central processing unit 14 as shown in step XII of the flowchart in FIG. 2 operates to display the item drawn on image memory 22 to the film 48. Thus, the central processing unit 14 provides a signal by way of the video converter 32 and CRT beam drive 34 to activate the CRT 40 turning on the CRT beam to display the rectangle 3 previously drawn to image memory 22 in the aforementioned step X as shown in FIG. 7E. The modified rectangle 3 as shown in FIG. 7E is displayed on the screen 38 at a constant electron beam intensity for exposure through the red filter to the film 48. The central processing unit 14 times the exposure by way of the timer program 28 to wait for the difference between the exposure time of rectangle 3 and the exposure time of the next succeeding rectangle 2 which difference for this second example as tabulated in FIG. 6C is 10 seconds. Thus, the exposure is timed as shown in step XIII of FIG. 2 for 10 seconds and thereafter ended by a stop command from the central processing unit 14 to the CRT 40 by way of the video converter 32 and CRT beam drive 34 as shown in step XIV of the flowchart of FIG. 2.

Figure 7F:
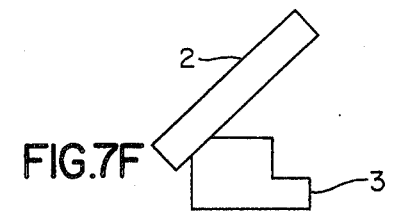
Figure 7G:
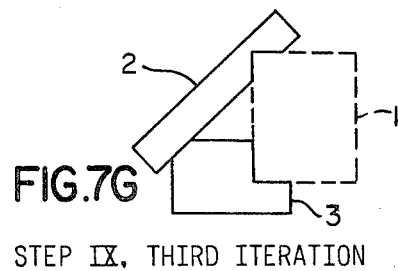

The central processing unit 14 thereafter commands a repeat of the aforementioned steps for the items (CCPG's) still to be exposed through the red filter. Thus, the next items to be retrieved in step VI from the items listed in descending order of exposure times in step V is the rectangle 2. Since the only item retrieved in step VI is the rectangle 2, it therefore necessarily has the highest foreground/background number in step VII and is drawn in image memory 22 in addition to the previously drawn and modified rectangle 3 in the second iteration of step VIII to provide the items in image memory 22 as shown in FIG. 7F.

In the next succeeding step IX, the central processing unit 14 commands that rectangle 1 be erased since it is at the next lowest foreground/background number 1 from the rectangle 2 and has a lower exposure time than that of the rectangle 2 previously drawn on image memory 22 in the second iteration of step VIII. The succeeding step X does not operate to redraw rectangle 1 since the rectangle 1 does not have an exposure time equal to or greater than the rectangles 2 or 3 which were previously drawn to image memory 22 in step VIII. Thus, the items drawn to image memory in the third iteration of step X are shown in FIG. 7H and include rectangles 2 and 3 as modified by the erasure of the overlapping portions of rectangle 1.

Figure 7H:
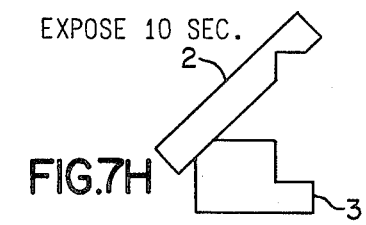

Since there are no further rectangles with lower foreground/background numbers, the central processing unit 14 commands that the items drawn on image memory 22 as shown in FIG. 7H be displayed to the film 48. The central processing unit 14 therefore provides a signal by way of the video converter 32 and CRT beam drive 34 to activate the CRT 40 turning on the CRT beam to display the rectangles 2 and 3 as shown in FIG. 7H to the film 48. The rectangles 2 and 3 are displayed on the screen 38 at a constant electron beam intensity for exposure through the red filter to the film 48. The central processing unit 14 times the exposure by the timer program 28 to wait for the difference between the exposure time of this group of rectangles (CCPG's) and the exposure time of the next succeeding CCPG, rectangle 1, which difference for the second example as shown in FIG. 6C is 10 seconds. Thus, the exposure is timed as shown in step XIII of FIG. 2 and thereafter ended by a stop command from the central processing unit 14 to the CRT 40 by way of the video converter 32 and CRT beam drive 34 as shown in step XIV of the flowchart of FIG. 2.

Figure 7I:
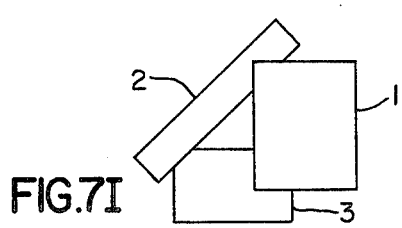

The central processing unit 14 thereafter commands a repeat of the aforementioned steps for all the items still to be exposed through the red filter. Thus, the next item retrieved in the third iteration of step VI is the rectangle 1 which being the only item retrieved necessarily also has the highest foreground/background number in step VII. The rectangle 1 retrieved in step VI is drawn to image memory 22 in addition to the previous items drawn to image memory 22 as shown in FIG. 7I. In the next succeeding step IX, no items are erased from image memory 22 since there are no remaining items left with a lower foreground/background number. In the next succeeding step X, no items are drawn or redrawn since there are no remaining items.

The next step implemented by the central processing unit 14 provides a signal by way of the video converter 32 and CRT beam drive 34 to activate the CRT 40 and turn on the CRT beam to visually display the items as shown in FIG. 7I at the constant electron beam intensity for exposure through the red filter to the film 48. The central processing unit 14 again times the exposure by way of the timer program 28 to wait for the difference between the exposure time of these rectangles (CCPG's) and the exposure time in the next succeeding group of items (CCPG's) which difference for the example shown in FIG. 6C is again 10 seconds. Thus, the exposure is timed as shown in step XIII of FIG. 2 and thereafter ended by a stop command from the central processing unit 14 to the CRT 40 by way of the video converter 32 and CRT beam drive 34 as shown in step XIV of the flowchart of FIG. 2.

Since there are no more items or rectangles to be exposed through the red filter, step XIV does not repeat any more steps; and, since the rectangles are exposed through only one red filter, there are no further iterations for other color filter positions as would otherwise be provided by step XVI.

Thus, it can be seen that that portion of the rectangle 3 not overlapped by the rectangles 1 and 2 is exposed through the red filter to the film 48 for a full 30 seconds in accordance with the tabulated exposure times of FIG. 6C in three consecutive 10 second exposure periods as illustrated, respectively, in FIGS. 7E, 7H, and 7I. In addition, it can be seen that that portion of the rectangle 2 not overlapped by the rectangle 1 is exposed through the red filter to the film 48 for a full 20 seconds in two 10 second exposure periods as illustrated in FIGS. 7H and 7I, respectively. Rectangle 1 which overlaps both rectangles 2 and 3 is exposed only for a 10-second interval in accordance with the exposure tabulations of FIG. 6C as illustrated by FIG. 7I. Thus, as is readily apparent, each rectangle including the overlapped areas is exposed to the film through the red filter to its appropriate exposure time in accordance with the tabulations of exposure times in FIG. 6C.

Referring now to FIGS. 8A–C in conjunction with FIGS. 9A–H, there is shown a third and last example in which the colors of the rectangles 1, 2, and 3 of FIG. 3 are tabulated as shown in FIG. 8A. Thus, rectangle 1 is a dark red requiring a 30 second exposure time, rectangle 2 is a light red requiring a 10-second exposure time, and rectangle 3 is a medium red requiring a 20 second exposure time, as shown in the tabulation of exposure times in FIG. 8C. Thus, for this example, steps I through V are accomplished in the preceding manner to provide the listed items in descending order of exposure times as shown in FIG. 8C.

Figure 9A:
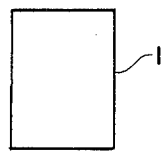
FIGS. 9A-9H show the graphic images drawn to computer image memory at various steps in the flowchart of FIG. 2 for the example of FIGS. 8A-8C.
Figure 9B:
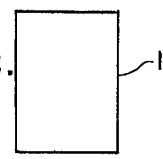

The central processing unit 14 thereafter commands in step VI that the next item be retrieved from the items listed in descending order of exposure times in step V which for this third example is rectangle 1. Since rectangle 1 is the only item retrieved in step VI, it necessarily has the highest foreground/background number in step VII and thus is drawn to image memory 22 in step VIII as shown in FIG. 9A. Since neither of the rectangles 2 nor 3 has a lower foreground/background number than rectangle 1, nothing is erased or drawn or redrawn in steps IX and X. Steps IX and X are not repeated by step XI and the items drawn on image memory 22 as shown in FIG. 9B are displayed to the film 48. Thus, the central processing unit 14 provides a signal by way of the video converter 32 and CRT beam drive 34 to activate the CRT 40, turning on the CRT beam to display the rectangle 1 as shown in FIG. 9B at a constant electron beam intensity for exposure through the red filter to the film 48. The central processing unit 14 times the exposure by way of the timer program 28 to wait for the difference between the exposure time of the rectangle 1 (CCPG) and the exposure time of the next succeeding items (CCPG's) which difference for the example shown in the tabulated exposure times of FIG. 8C is 10 seconds. Thus, the exposure is timed as shown in step XIII and thereafter ended by a stop command from the central processing unit 14 to the CRT 40 by way of the video converter 32 and CRT beam 34 as shown in step XIV of the flowchart of FIG. 2.

Figure 9C:
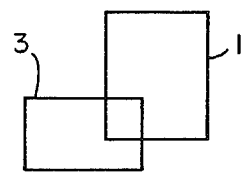

The next succeeding step XV operates to repeat step VI and retrieve the next item from the tabulated list of exposure times in step V as shown in FIG. 8C. The item having the next longest exposure time is rectangle 3 which is retrieved in step VI; and, since only one item is retrieved in step VI, it necessarily also has the highest foreground/background number for purposes of step VII. Thus, rectangle 3 is drawn to the image memory 22 in addition to the previously drawn rectangle 1 so that FIG. 9C represents the items as drawn to image memory 22 in the second iteration of step VIII of the flowchart of FIG. 2.

Figure 9D:
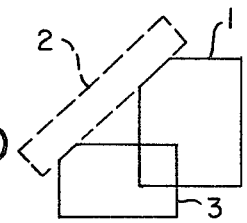
Figure 9E:
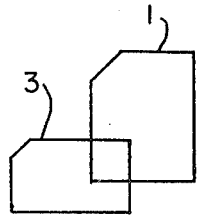
Figure 9F:
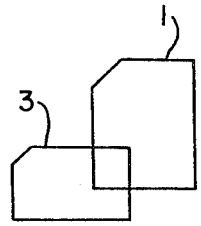

The next succeeding step IX operates to erase rectangle 2 from the image drawn to image memory 22 as shown in FIG. 9D. Rectangle 2 is erased since it has the next lowest foreground/background number from the rectangle 3 and additionally has a lower exposure time (10 seconds) from the rectangle 3 (20 seconds). Rectangle 2 is neither drawn nor redrawn in step X since it does not have an exposure time equal to or greater than the exposure time of rectangle 3. Thus, the items drawn to image memory 22 in step X are shown in FIG. 9E and comprise the rectangles 1 and 3 from which the overlapped portions of rectangle 2 have been erased.

The next succeeding step XI repeats steps IX and X for a third iteration. As is readily apparent from FIG. 9F, no further erasures occur in step IX since rectangle 1 which has the next lowest foreground/background number to the previously-erased rectangle 2 does not have a lower exposure time than the rectangle 2. In the next succeeding step X, rectangle 1 is redrawn in its entirety since it has a foreground/background number equivalent to the foreground/background number of the previous step IX and an exposure time of 30 seconds which is greater than the exposure time of the rectangle 3 drawn to image memory 22 in the previous step VIII and since there has been an erasure since step VI. Since there are no further rectangles having lower foreground/background numbers, the central processing unit 14 commands no further repeat of steps IX and X by way of step XI and thus the items drawn to image memory 22, as shown in FIG. 9G are displayed to the film 48.

Figure 9G:
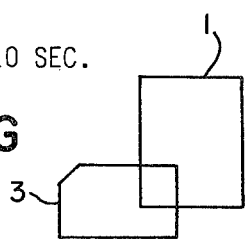

The central processing unit 14 provides a signal by the video converter 32 and CRT beam drive 34 to activate the CRT 40 turning on the CRT beam to display the items as shown in FIG. 9G previously drawn to image memory 22 on the screen 38 at a constant electron beam intensity for exposure through the red filter to the film 48. The processing unit 14 times the exposure by way of the timer program 28 to wait for the difference between the exposure time of rectangles 1 and 3 (CCPG's) and the exposure time of the next succeeding rectangle 2 (CCPG) which difference for the example shown by the tabulated exposure times of FIG. 8C is 10 seconds. Thus, the exposure is timed as shown in step XIII of FIG. 2 and thereafter ended by a stop command from the central processing unit 14 to the CRT 40 by way of the video converter 32 and CRT beam drive 34 as shown in step XIV of the flowchart of FIG. 2.

The next succeeding step XV repeats the aforementioned steps starting with the retrieval in step VI of the next item from the items listed in descending order of exposure times as shown by the tabulation in FIG. 8C.

Figure 9H:
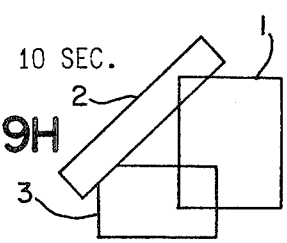

The next item to be retrieved in step VI is rectangle 2 which being the only new item retrieved is necessarily the highest foreground/background number in step VII. Thus, rectangle 2 is drawn in addition to the previously-drawn rectangles 1 and 3 of image memory 22 to define the items as shown in FIG. 9H in the third iteration of step VIII. The next succeeding step IX does not operate to erase any items from image memory 22 since the item with the next lowest foreground/background number is rectangle 1 which does not have a lower exposure time than rectangle 2. The next succeeding step X does not operate to draw or redraw any items to image memory 22 since there have been no erasures made since the last iteration of step VI. Since there is no further repeat of steps IX and X, the items drawn to image memory 22 are as shown in FIG. 9H and thereafter displayed to the film 48.

The central processing unit 14 again provides a signal by way of the video converter 32 and CRT beam drive 34 to activate the CRT 40 turning on the CRT beam to display the rectangles 1, 2, and 3 (CCPG's) previously drawn to image memory 22 as shown in FIG. 9H on the screen 38 at a constant electron beam intensity for exposure through the red filter to the film 48. The central processing unit 14 times the exposure by way of the timer program 28 to wait for the difference between the exposure time of the rectangles 1, 2, and 3 and the exposure time of the next succeeding group of items which for this third example there are none. Thus, the exposure is timed for 10 seconds and thereafter ended by a stop command in the central processing unit 14 to the CRT 40 by way of the video converter 32 and CRT beam drive 34 as shown in step XIV of the flowchart of FIG. 2. Since there are no remaining items to be exposed through the red filter from the list of step V, there is no further repeat for the remaining items by way of step XV; and, since all the items are exposed through only the red color filter, there is no further repeat of exposures through the blue and green filters by way of step XVI.

Thus, it can be seen that rectangle 1 is exposed in its entirety for the full 30-second duration of exposure in accordance with the tabulated exposure times of FIG. 8C in three consecutive 10 second exposure intervals as shown in FIGS. 9B, 9G, and 9H; respectively. Rectangle 3 minus its area overlapped by rectangle 2 is exposed for its full 20-second duration through the red filter to the film 48 in accordance with the tabulated exposure times of FIG. 8C in two consecutive 10 second exposure intervals as illustrated by FIGS. 9G and 9H, respectively. Finally, rectangle 2 is exposed for its 10-second duration in accordance with the exposure times tabulated in FIG. 8C in one 10 second exposure interval as illustrated in FIG. 9H. Thus, each rectangle is exposed to the film 48 through the red filter for its appropriate exposure times so as to maintain a full 30-second exposure of the rectangle 1 including those portions of the rectangle 1 which overlap the rectangles 2 and 3, to maintain a 20-second exposure of the rectangle 3 excepting those areas overlapped by the rectangles 2 and 1, and to maintain a 10-second exposure of the rectangle 2 excepting that portion overlapped by the rectangle 1.

Thus, in this manner there is provided a method and apparatus whereby a selected order in foreground to background of items displayed on the screen of the CRT for exposure to a photosensitive material may be maintained in a system wherein the electron beam is either off or on at a constant intensity. It will be readily apparent that although the CRT 40 is illustrated, it will be equally apparent to also utilize any light source arrangement admitting light in the red, green, and blue spectrum in place of the CRT. In addition, although the CRT 40 has been described as being controlled by the central processing unit to end the display of each group of items (CCPG's) during each incremental exposure time, it will be equally apparent that this timing function could be accomplished by an appropriate shutter arrangement timed by the central processing unit. It will be also apparent that the (CCPG's) could alternatively be generated with select electronic circuits instead of the aforementioned computer implemented algorithms.

Other embodiments of the invention including additions, subtractions, deletions and other modifications of the preferred disclosed embodiments of the invention will be obvious to those skilled in the art and are within the scope of the following claims.

What is claimed is:

1. In a system for defining and displaying an image for photographic reproduction in which the image to be photographed is defined and stored within a computer memory as a plurality of constant color pixel groups and in which each constant color pixel group is displayed to expose a selected photosensitive material at a selected uniform light color and intensity for the appropriate exposure time and in which the time during which the selected photosensitive material should be exposed at the selected light color and intensity is determined for each of the constant color pixel groups and in which the determined exposure times are ordered into a progressively decreasing sequence so that the constant color pixel groups can be displayed to expose the photosensitive material in the ordered sequence starting with the first of the constant color pixel groups in the ordered sequence having the longest exposure time and thereafter adding succeeding constant color pixel groups in the ordered sequence so as to finally display all of the constant color pixel groups, the improvement comprising:
    means for providing a selected ordered foreground to background relationship between the constant color pixel groups such that said selected ordered foreground to background relationship is maintained in the exposure of the photosensitive material to the overlapping areas between the constant color pixel groups wherein said means for providing said selected ordered foreground to background relationship erases those portions of each constant color pixel group which are overlapped by another constant color pixel group yet to be displayed because of its succeeding position in the ordered sequence.

2. A system for defining and displaying an image for photographic reproduction comprising:
    display means for visually displaying the image to be photographed; and
    computer means responsive to user controlled input signals and a preselected program for defining and storing within a computer variable memory the items of the image to be photographed as a plurality of constant color pixel groups and for assigning a foreground/background number to each said constant color pixel group in the order in which said constant color pixel groups should appear from foreground to background in the image so as to thereafter provide a signal to said display means to display each of said constant color pixel groups at a selected light color and intensity to expose a selected photosensitive material while maintaining said selected ordered foreground to background relationship in the exposure of the photosensitive material to the overlapping areas between the constant color pixel groups wherein said computer means determines the time during which the selected photosensitive material should be exposed at the selected light color and intensity for each of the constant color pixel groups and wherein the determined exposure times are ordered into a progressively decreasing sequence so that the constant color pixel groups can be displayed to expose the photosensitive material in said ordered sequence starting with the first of the constant color pixel groups in said ordered sequence having the longest exposure times and thereafter adding succeeding constant color pixel groups in the ordered sequence so as to finally display all of the constant color pixel groups, said computer means erasing those portions of each constant color pixel group which are overlapped by another constant color pixel group yet to be displayed because of its succeeding position in said ordered sequence.

3. The system of claim 2 wherein said light color is selected in another ordered sequence from the three primary red, green, and blue colors and wherein said exposure times are determined for each of said primary red, green, and blue colors for each of said constant color pixel groups.

4. The system of claim 3 wherein said display means comprises a black-and-white display screen and wherein said system further comprises means for sequentially moving red, green, and blue filters over said black-and-white display screen to provide said ordered sequence of primary colors.

5. A method for defining and photographing an image of a plurality of items having different foreground/background relationships with respect to each other comprising the steps of:
    A. defining and storing within a computer variable memory the items of the image to be photographed as a plurality of constant color pixel groups and assigning a foreground/background number to each said constant color pixel group in the order in which said constant color pixel groups appear from foreground to background in the image;
    B. determining the time during which a selected photosensitive material must be exposed to a selected light color and intensity for each of said constant color pixel groups;
    C. ordering said determined exposure times for each of said constant color pixel groups into a progressively decreasing sequence;
    D. drawing on a computer image memory all constant color pixel groups from the highest said determined exposure times and with the same foreground/background number indicative of the furthest background position,
    E. erasing from said computer image memory all constant color pixel groups having both a foreground/background number indicative of the next closest background position from that of step D and a determined exposure time less than that of step D;
    F. redrawing on said computer image memory all constant color pixel groups having the same foreground/background number as the constant color pixel groups of step E and a determined exposure time greater than the determined exposure times of the constant color pixel groups of step D and drawing on said computer image memory all constant color pixel groups having the same foreground-/background number as the constant color pixel groups of step E and a determined exposure time equal to the determined exposure times of the constant color pixel groups of step D;

G. repeating steps E through F for all constant color pixel groups having a foreground/background number indicative of the next closest background position from that of the previous step E until reaching the constant color pixel groups having the foremost foreground/background number;

H. visually displaying at said selected light color and intensity all said constant color pixel groups drawn to said computer image memory in said preceding step for an exposure time equal to the difference between its determined exposure time and the next succeeding determined exposure time from step B; and I. repeating steps D through F for all constant color pixel groups having the next longest determined exposure time from that of the previous step D until reaching the constant color pixel groups having the shortest determined exposure times.

6. The method of claim 5 wherein the redrawing on computer image memory in step F is not done if there have been no erasures in any of the preceding step E's since step D was last implemented.

7. The method of claim 6 wherein the redrawing on is selected in another ordered sequence from the three red, green, and blue colors and wherein said exposure times are determined for each of said primary red, green, and blue colors for each of said constant color pixel groups.

8. The method of claim 7 wherein said constant color pixel groups are visually displayed on a black-and-white display screen and wherein said ordered sequence of primary colors is provided by sequentiall moving red, green, and blue filters over said black-and-white display screen.

9. A system for defining and displaying an image for photographic reproduction comprising:

display means for visually displaying the image to be photographed; and computer means responsive to user controlled input signals and a preselected program for defining and storing within a computer variable memory the items of an image to be photographed as a plurality of constant color pixel groups and assigning a foreground/background number to each said constant color pixel groups in the order in which said constant color pixel groups appear from foreground to background in the image; for thereafter determining the time during which a selected photosensitive material must be exposed to a selected light color and intensity for each of said constant color pixel groups; for thereafter ordering said determined exposure times for each of said constant color pixel groups into a progressively decreasing sequence; for thereafter drawing on a computer image memory all constant color pixel groups from the highest of said determined exposure times and with the same foreground/background number indicative of the furthest background position; for thereafter erasing from said computer image memory all constant color pixel groups having both a foreground-/background number indicative of the next closest background position from that of the constant color pixel groups previously drawn and a determined exposure time less than that of the constant color pixel groups previously drawn; for thereafter redrawing on said computer image memory all of said constant color pixel groups having the same foreground/background number as the constant color pixel groups to have been previously erased and a determined exposure time greater than the determined exposure times of the constant color pixel group previously drawn on said computer memory and drawing on said computer image memory all of said constant color pixel groups having the same foreground/background number as the constant color pixel groups previously erased and a determined exposure time equal to the determined exposure times of the constant color pixel groups previously drawn; for thereafter repeating said erasing and redrawing for all constant color pixel groups having a foreground/background number indicative of the next closest background position from that of said previous erasing step until reaching the constant color pixel groups having the foremost foreground/background number; for thereafter providing a video image signal to said video display means in order to display at said selected light color and intensity all said constant color pixel groups previously drawn to said computer image memory for an exposure time equal to the difference between its determined exposure time and the next succeeding determined exposure time in said order; and for finally thereafter repeating said drawing, erasing, redrawing, repeating and displaying steps for all constant color pixel groups having the next longest determined exposure time from that of the previously drawn constant color pixel groups until reaching the constant color pixel groups having the shortest determined exposure times.

10. The system of claim 9 wherein said redrawing step on computer image memory is not done if there have been no preceding erasures, since the most recent drawing on computer image memory of all constant color pixel groups from the next highest of said determined exposure times with the same foreground/background number indicative of the furthest background position.

11. The system of claim 10 wherein said light color is selected in another ordered sequence from the three primary red, green, and blue colors and wherein said exposure times are determined for each of said primary red, green, and blue colors for each of said constant color pixel groups.

12. The system of claim 11 wherein said display means comprises a black-and-white display screen and wherein said system further comprises means for sequentially moving red, green, and blue filters over said black-and-white display screen to provide said ordered sequence of primary colors.

* * * * *